United States Patent [19]

Harada et al.

[11] 4,439,205

[45] Mar. 27, 1984

[54] AQUEOUS LIQUID DYE COMPOSITION: STORAGE STABLE REACTIVE DYE WITH REDUCTION INHIBITOR

[75] Inventors: Naoki Harada, Ibaraki; Sadaharu Abeta, Toyonaka, both of Japan

[73] Assignee: Sumitomo Chemical Company, Limited, Osaka, Japan

[21] Appl. No.: 323,365

[22] Filed: Nov. 20, 1981

[30] Foreign Application Priority Data

Dec. 22, 1980 [JP] Japan ................................ 55-182408

[51] Int. Cl.³ .......................................... C09B 67/26
[52] U.S. Cl. .......................................... 8/527; 8/543; 8/549; 8/918
[58] Field of Search ..................................... 8/527, 543

[56] References Cited

U.S. PATENT DOCUMENTS

| 4,072,463 | 2/1978 | Schlafer et al. | 8/527 |
| 4,078,884 | 3/1978 | Opitz et al. | 8/527 |
| 4,149,850 | 4/1979 | Schlafer et al. | 8/527 |

FOREIGN PATENT DOCUMENTS

| 2003363 | 8/1970 | Fed. Rep. of Germany . |
| 914051 | 12/1962 | United Kingdom . |
| 1166379 | 10/1969 | United Kingdom . |

*Primary Examiner*—A. Lionel Clingman
*Attorney, Agent, or Firm*—Stevens, Davis, Miller & Mosher

[57] ABSTRACT

An aqueous liquid dye composition containing 5 to 35% by weight of a reactive dye, 0.05 to 30% by weight of a reduction inhibitor and water. This composition is stable to storage for a long period of time or storage at relatively high temperatures.

12 Claims, No Drawings

AQUEOUS LIQUID DYE COMPOSITION: STORAGE STABLE REACTIVE DYE WITH REDUCTION INHIBITOR

The present invention relates to an aqueous liquid composition of reactive dyes, which has good storage stability.

Reactive dyes of various types such as β-sulfatoethylsulfone, monochlorotriazine, monofluorotriazine, dichloroquinoxaline, dichlorotriazine, difluoropyrimidine, difluorochloropyrimidine and trichloropyrimidine, which have been used for dyeing cellulose fiber materials, are formulated into aqueous dye compositions because of reasons described in, for example, Published unexamined Japanese Patent Application No. 136314/75. Further, because of the recent remarkable decrease in petroleum resources and rise in oil cost, the dyeing industry also has been obliged to take up saving energy as the most serious problem to be solved. And also in dyeing of cellulosic fibers with reactive dyes, a one-bath pad-batch method requiring no thermal energy at all is finding markedly increasing uses. For carrying out this method using powdery dyes, however, it is necessary to dissolve the powdery dye in hot water and then cool the dye solution to room temperature, which is quite unreasonable in terms of energy and operation. Thus, aqueous liquid compositions of reactive dyes have been developed to improve such drawback of powdery dyes. But, the liquid dye compositions easily decompose, for example, by long-term storage or at relatively high temperatures, thereby easily producing chemical or physical changes in the composition. Consequently, when the liquid dye compositions after long-term storage are used for dyeing by the known methods, they produce completely different dyed products from those which could be obtained using the liquid dye compositions immediately after the preparation.

Published unexamined Japanese Patent Application No. 136314/75 discloses aqueous liquid compositions of reactive dyes, containing 5 to 35% by weight of a dye having both sulfonic acid and reactive groups and 1 to 5% by weight of a buffer agent and having a pH of 3 to 7. In this manner, an aqueous liquid composition having a storage stability improved to some extent can be obtained. But, this composition produces precipitates 2 to 3 minutes after having been allowed to mix with the alkali liquor, and therefore uniform application of the dye to cellulosic fibers is difficult. Further, it was found that the color yield was extremely decreased.

In order to provide aqueous liquid compositions of reactive dyes which are more stable to storage over long periods of time or at relatively high temperatures, and besides which are capable of dyeing cellulose fiber materials deep by any dyeing methods known per se, the present inventors have extensively studied and found that incorporating a reduction inhibitor in aqueous reactive dye solutions markedly improves the stability of the compositions to storage over long periods of time or at relatively high temperatures.

The present invention provides an aqueous liquid dye composition containing 5 to 35% by weight of a reactive dye, 0.05 to 30% by weight of a reduction inhibitor and water.

The present invention is illustrated in detail as follows.

The reactive dyes used in the present invention include monoazo dyes and polyazo dyes such as disazo and trisazo dyes, having as the reactive group a β-sulfatoethylsulfone, monochlorotriazine, monofluorotriazine, dichloroquinoxaline, dichlorotriazine, difluoropyrimidine, difluorochloropyrimidine or trichloropyrimidine group or other well-known reactive groups; and reactive dyes described in Published Examined Japanese Patent Application No. 10188/63 having a plural number of the above reactive groups which may be the same or different. Examples of the reactive dyes include, for example, C.I. Reactive Yellow 2, C.I. Reactive Yellow 14, C.I. Reactive Orange 16, C.I. Reactive Red 22, C.I. Reactive Blue 43, C.I. Reactive Blue 100, C.I. Reactive Brown 21, C.I. Reactive Black 5 and the like. Of these, C.I. Reactive Black 5, as represented by a free acid of the formula,

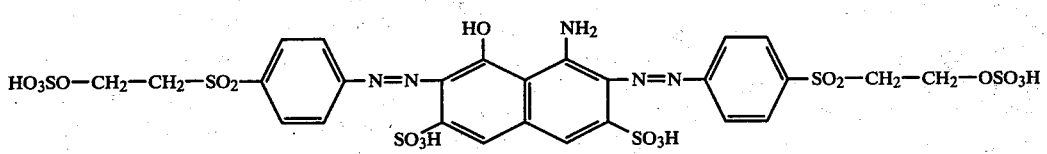

is most preferably used.

These reactive dyes may be used each alone or in combination of two or more. For the preparation of aqueous liquid dye composition, at least one of the reactive dyes may be dissolved in water in an amount of 5 to 35% by weight.

The reduction inhibitor used in the present invention is not particularly limited, but generally includes sodium or potassium meta-nitrobenzenesulfonate, sodium or potassium nitrite, sodium or potassium chlorate, sodium or potassium perchlorate, sodium or potassium percarbonate and the like, which may be used each alone, or in combinations of two or more.

At least one of these reduction inhibitors is incorporated in the above aqueous dye solution in an amount of 0.05 to 30% by weight.

As to the amount of the inhibitor to be incorporated, those having a weak effect, such as sodium meta-nitrobenzenesulfonate, are used preferably in an amount of 5 to 30% by weight, whereas, those having a strong effect, such as sodium nitrite and sodium chlorate, are used preferably in an amount of 0.05 to 5% by weight.

For the purpose of further improving the storage stability of the aqueous liquid compositions of reactive dyes in accordance with the present invention, for example, sodium or potassium acetate, sodium or potassium oxalate, acid sodium or acid potassium phosphate, various sodium or potassium salts of phosphoric acid, mixtures thereof, or buffers such as sodium borate may be added to the compositions.

According to the present invention, even after storage at room temperature for several months, for example 12 months, or in an atmosphere of 60° C. for several weeks, for example 4 weeks, the aqueous dye compositions can retain the same color strength as that of those immediately after the preparation, and besides produce dyed products and printed products having unchanged color tint.

As to the method for producing aqueous liquid dye composition and method for storage of reactive dye of the present invention, there is no limitation. In view of industrial convenience, generally, dye and other material such as reduction inhibitor are separately dissolved in water and then the aqueous solutions are incorporated with each other.

The present invention will be illustrated in more detail with reference to the following examples, which are not however to be interpreted as limiting the invention thereto.

EXAMPLE 1

Thirty parts by weight of sodium metanitrobenzenesulfonate was added to 200 parts by weight of a clear aqueous dye solution of pH 6.0 containing 20 wt. % of C.I. Reactive Black 5, to obtain an aqueous liquid dye composition having a dye content of 17.4 wt. % and a pH of 6.3.

Using a dip dyeing bath, padding bath and printing paste prepared in a usual manner, each using 2 parts of the dye composition, dyeing and printing of cotton were carried out, each in conventional manner to obtain each products dyed or printed in a black or gray shade.

The dye composition obtained above was stored at room temperature for 12 months, or at 60° C. for 4 weeks, each in a sealed container. Thereafter, using each dye composition the dyeing and printing were carried out in the same manner as above. Then, products having the same color depth and shade as above were obtained, respectively.

EXAMPLE 2

One part by weight of sodium acetate and 0.5 part by weight of sodium nitrite were added to 200 parts by weight of a clear aqueous dye solution of pH 6.0 containing 20 wt. % of C.I. Reactive Black 5 to obtain an aqueous liquid dye composition having a dye content of 19.9 wt. % and a pH of 6.3.

Using a dip dyeing bath, padding bath and printing paste prepared in a usual manner, each using 2 parts of the dye composition, dyeing and printing of cotton were carried out, each in conventional manner to obtain products dyed or printed, each in a black or gray shade.

The dye composition obtained above was stored at room temperature for 12 months or at 60° C. for 4 weeks, each in a sealed container. Thereafter, using each dye composition, the dyeing and printing were carried out in the same manner as above. Then, products having the same color depth and shade as above were obtained, respectively.

EXAMPLE 3

0.5 Part by weight of sodium chlorate was added to 200 parts by weight of a clear aqueous dye solution of pH 5.6 containing 15 wt. % of C.I. Reactive Red 22, to obtain an aqueous liquid dye composition having a dye content of 14.9 wt. % and pH of 5.8.

Using a dip dyeing bath, padding bath and printing paste prepared in a usual manner, each using 2 parts of the dye composition, dyeing and printing of cotton were carried out, each in a conventional manner to obtain products dyed or printed, each in a red shade.

The dye composition obtained above was stored at room temperature for 12 months or at 60° C. for 4 weeks, each in a sealed container. Thereafter, using each dye composition, the dyeing and printing were carried out in the same manner as above. Then, products having the same color depth and shade as above were obtained, respectively.

EXAMPLE 4

Fifteen parts by weight of sodium metanitrobenzenesulfonate and 0.2 part by weight of sodium nitrite were added to 200 parts by weight of a clear aqueous dye solution of pH 5.4 containing 15 wt. % of C.I. Reactive Yellow 14, to obtain an aqueous liquid dye composition having a dye content of 13.9 wt. % and a pH of 6.0.

Using a dip dyeing bath, padding bath and printing paste prepared in a usual manner, each using 2 parts of the dye composition, dyeing and printing of cotton were carried out, each in a conventional manner to obtain each products dyed or printed in an yellow shade.

The dye composition obtained above was stored at room temperature for 12 months or at 60° C. for 4 weeks, each in a sealed container. Thereafter, using each dye composition, the dyeing and printing were carried out in the same manner as above. Then, products having the same color depth and shade as above were obtained, respectively.

COMPARATIVE EXAMPLE 1

Using 2 parts by weight of a clear aqueous dye solution of pH 6.0 containing 20 wt. % of C.I. Reactive Black 5, a dip-dyeing bath, padding bath and printing paste were prepared in a usual manner. Dyeing and printing of cotton were carried out in a conventional manner to obtain products, each dyed or printed in a black or gray shade.

The above prepared aqueous liquid composition was stored either at room temperature for 12 months or at 60° C. for 4 weeks, each in a sealed container, and then used for dyeing and printing in the same manner as above. The dyed products and printed products thus obtained showed a remarkable reduction in color yield, and their color markedly changed to brown.

COMPARATIVE EXAMPLE 2

Five parts by weight of sodium acetate was added to a clear aqueous dye solution of pH 6.0 containing 20 wt. % of C.I. Reactive Black 5 to obtain an aqueous liquid dye composition having a dye content of 19.5 wt. % and pH of 6.0.

Using 2 parts by weight of this solution, a dip-dyeing bath, padding bath and printing paste were prepared in a usual manner. Dyeing and printing of cotton were carried out in a conventional manner to obtain products dyed and printed in a black or gray shade.

While, the above prepared liquid composition was stored either at room temperature for 12 months or at 60° C. for 4 weeks, each in a sealed container, and then used for dyeing and printing in the same manner as above. The dyed products and printed products thus obtained showed a reduction in color yield, and their color changed to brown.

What is claimed is:

1. An aqueous liquid dye composition consisting essentially of 5 to 35% by weight of a reactive dye, 0.05 to 30% by weight of at least one reduction inhibitor selected from sodium or potassium nitrite, sodium or potassium chlorate, sodium or potassium perchlorate and sodium or potassium percarbonate, and water.

2. The composition according to claim 1, wherein the reactive dye is at least one member selected from C.I. Reactive Yellow 2, C.I. Reactive Yellow 14, C.I. Reactive Orange 16, C.I. Reactive Red 22, C.I. Reactive Blue 43, C.I. Reactive Blue 100, C.I. Reactive Brown 21 and C.I. Reactive Black 5.

3. The composition according to claim 1, wherein the reactive dye is C.I. Reactive Black 5.

4. The composition according to claim 1, further containing at least one member selected from the group consisting of sodium acetate, potassium acetate, sodium oxalate, potassium oxalate, acid sodium phosphate, acid potassium phosphate, sodium salts of phosphoric acid, potassium salts of phosphoric acid and a buffer.

5. A method for producing an aqueous liquid dye composition having a good storage stability, which comprises dissolving a reactive dye in water to make a 5 to 35% by weight aqueous solution, and incorporating 0.05 to 30% by weight of at least one reduction inhibitor selected from sodium or potassium nitrite, sodium or potassium chlorate, sodium or potassium perchlorate and sodium or potassium percarbonate, into the aqueous solution, said composition consisting essentially of water, said dye and said reduction inhibitor.

6. A method for storage of a reactive dye, which comprises producing a dye composition by dissolving the reactive dye in water to make a 5 to b 35% by weight aqueous solution, and incorporating 0.05 to 30% by weight of at least one reduction inhibitor selected from sodium or potassium nitrite, sodium or potassium chlorate, sodium or potassium perchlorate and sodium or potassium percarbonate, into the aqueous solution, said dye composition consisting essentially of water, said dye and said reduction inhibitor.

7. A method for dyeing cellulose fiber materials, which comprises using an aqueous liquid dye composition consisting essentially of a 5 to 35% by weight aqueous solution of reactive dye and 0.05 to 30% by weight of at least one reduction inhibitor selected from sodium or potassium nitrite, sodium or potassium chlorate, sodium or potassium perchlorate and sodium or potassium percarbonate.

8. The composition according to claim 4, wherein said buffer is sodium borate.

9. The composition of claim 1, wherein the amount of said reduction inhibitor is 0.05 to 5% by weight.

10. The method of claim 5, wherein the amount of said reduction inhibitor is 0.05 to 5% by weight.

11. The method of claim 6, wherein the amount of said reduction inhibitor is 0.05 to 5% by weight.

12. The method of claim 7, wherein the amount of said reduction inhibitor is 0.05 to 5% by weight.

* * * * *